July 12, 1932.  C. EISLER  1,866,634
BEAD MACHINE
Filed Jan. 10, 1928    2 Sheets-Sheet 1

INVENTOR:
Charles Eisler,
BY
Wm H Caufield,
ATTORNEY.

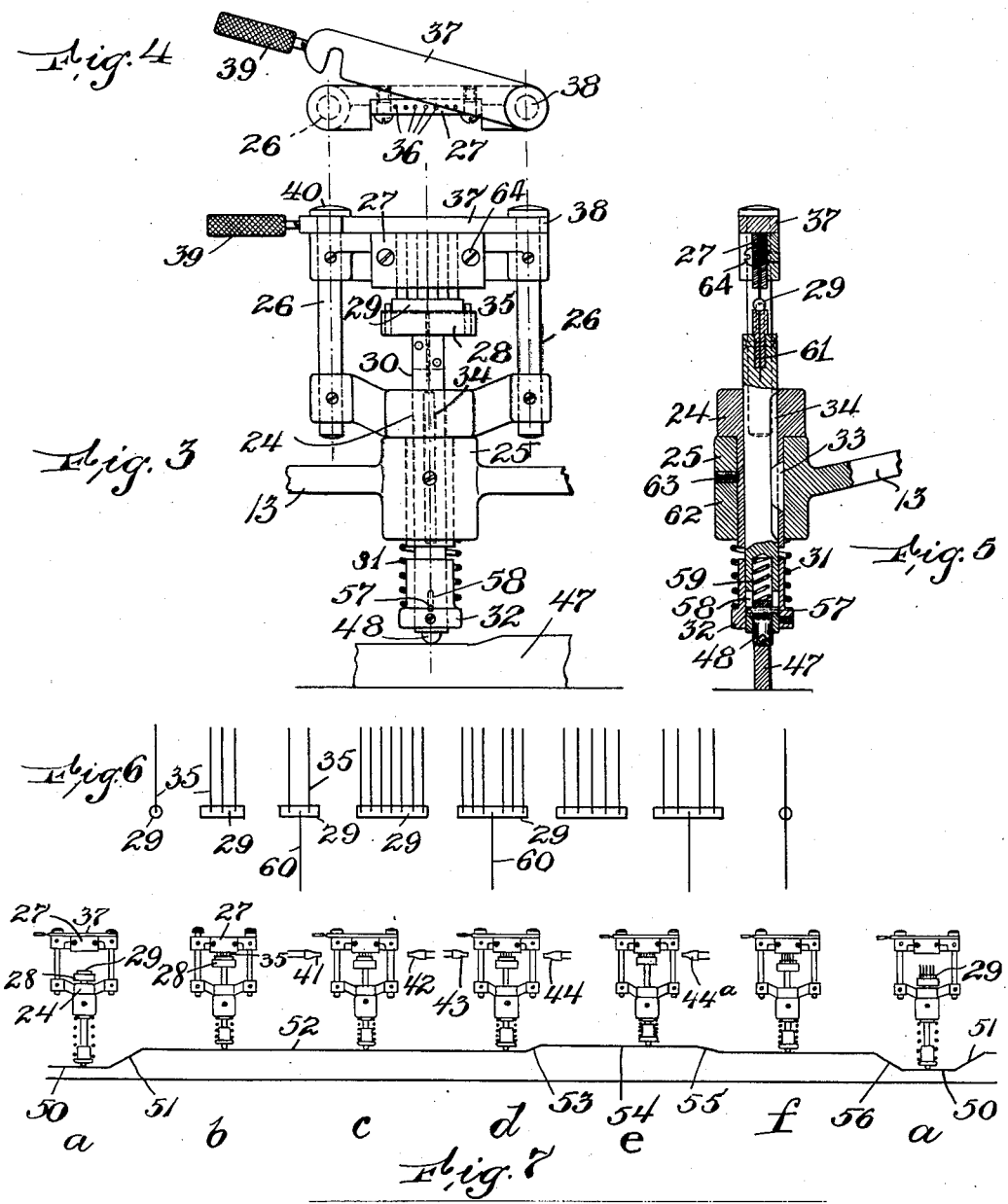

Patented July 12, 1932

1,866,634

UNITED STATES PATENT OFFICE

CHARLES EISLER, OF NEWARK, NEW JERSEY

BEAD MACHINE

Application filed January 10, 1928. Serial No. 245,676.

This invention relates to a machine for making what are known in the trade as beads, these beads being used for mounting such things as grid plates and filaments in radio tubes but are in no means confined to this line. The beads are made of a glass base and in this base wires are seated being pressed into place when the glass is heated to a point where it is soft.

The invention is a machine in which the base, usually made of short lengths of cane glass is supported in a position opposite a die block in which the wire or wires have been placed. The machine carries these elements past a flame for melting or softening the glass and then pushes one or both of them to force the end of the wire into the glass and then carries the assembled article to a point where it is lifted out and new base and wire inserted.

The machine is operated for production by an intermittent motion which allows a series of holders to be used and these are successively filled and emptied by an operator during the halts in the machines operation and these halts allow properly timed subjection of the beads to the heating.

The invention is a machine that is easily fed and relieved of the articles and occupies but little space and is also simple in construction with the result that operations and repairs are easy.

Figure 1:
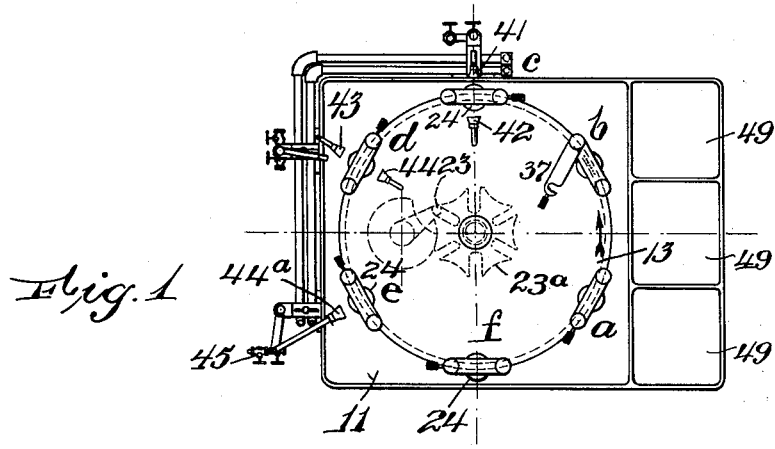
Figure 2:
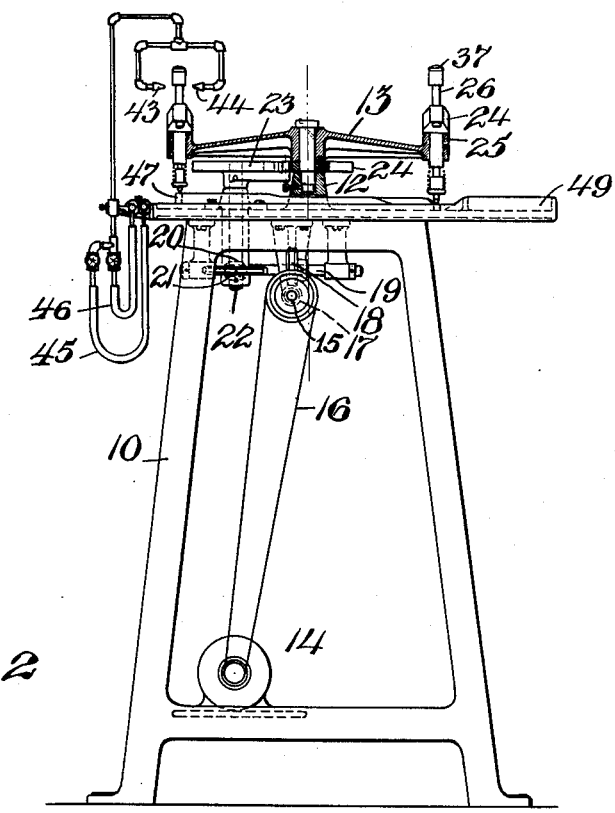

One embodiment of the invention is illustrated in the accompanying drawings, in which Figure 1 is a top view of the machine and Figure 2 is a side view thereof with the rotatable support at the top shown in section. Figure 3 is a detail front view of a head for holding the beads and Figure 4 is a top view thereof. Figure 5 is a central vertical section through Figure 4. Figure 6 is a view showing various forms of beads possible of manufacture in the machine shown. Figure 7 is a straight projection of the holders and an operating cam to illustrate the successive positions of the parts.

The machine can be mounted on any suitable support and I show a table 10 on which is the flat top 11, having a bearing 12 for the rotatable head 13 to be hereinafter described.

The machine is operated from the motor 14 which drives the shaft 15 by the belt 16. The worm 17 and worm gear 18 drive the shaft 19 at a reduced speed and further reduction is secured through worm 20 in shaft 19 and worm gear 21 on shaft 22. The shaft 22 has the driving member 23 of a Geneva movement, the other member 23$^a$ of which is secured to the rotatable head 13. This or any other equivalent mechanism is used to rotate the head 13 with an intermittent or step-by-step motion.

On the head is a support or supports, usually about six, each of which is provided with a base 24 to rest on the boss 25 of the head 13. The side posts 26 support the die block 27 which holds the wires.

The holder 28 is for the base and is shown as one for a base made from cane glass, that is, the base is a short cylindrical bar of glass shown at 29 and the holder is hollowed at the top to form a shallow trough in which the glass base rests. The holder 28 is movable vertically on the rod 30 and while it may be allowed to drop by gravity the spring 31 is used to insure the downward movement as the spring abuts on the bottom side of the boss 25 and on the collar 32 secured on the end of the rod 30. A suitable key 33 working in the slot 34 keeps the rod 30 from turning and this insures the position of the base under the wires 35 which are dropped into holes 36 in the die block, the wires resting on the base and being held against upward movement by the cover 37 which is pivoted at 38. The cover is swung by its handle 39 and is also held down by the slotted portion 40 fitting under the head 41 of the side post 26.

As the head 13 rotates with the intermittent movement, each base is subjected to a heating at points in the rotation of the head and I show double burners 41 and 42 and a second set 43 and 44 which act on the glass base to soften the glass to a consistency that maintains its shape but softens it enough to allow the wires 35 to enter the base when they are pressed together. The burners are supplied by the gas pipe 45 and the air pipe 46 which also supply an annealing burner 44$^a$ which supplies less heat and prevents the bead from cooling too quickly.

The holders are pressed one toward the other by a cam 47 which rests on the table 11 and on which rides the end 48 of each rod 30. The cam is circular but is shown in a straight projection in Figure 7.

In operation the machine works as follows:—

The operator is at the machine opposite the trays 49 one of which contains bases, one contains wires and the other is for the product of the machine. As a head stops at the point a (Figure 1) the base is placed on the holder 28 as shown also at a in Figure 7 as the cam has the low surface 50 at this point. The head is then rotated for one movement to bring it to b and the rise 51 in the cam lifts the rod 30 and the holder 28 to bring the base up near the bottom of the die block so that at b the base receives the bottom end of the wires 35 which are dropped into the holes 36 to the number required by the particular style of bead being made. The cover 37 is then swung again to closed position, having been opened to allow the insertion of the wires.

At the next two stops, at c and d the bead is subjected to the action of the flames from the burners 41, 42, 43 and 44 and as it passes to the annealing burner at e the rod 30 is lifted from the surface 52, on which it is travelling, by the rise 53 to the higher surface 54 and the hot base is pressed up against the wires and the ends of the latter are embedded in the glass and at this point the annealing burner 44ª anneals the glass and the wires are sealed in the glass. At the next stop at f the pressure is reduced by the drop 55 in the cam and as the holder again proceeds back to a, at the right of Figure 7 the holder moves downward on the slope 56 back to the low surface 50, and the wires and the glass forming the assembled bead can be lifted from the head by the tweezers and put in the tray 49 for such product. It is at once replaced by a fresh base and the operation is repeated.

In order to prevent crushing of the glass by any irregularities, the end 48 of the rod 30 is movable therein to a slight extent, with a pin 57 riding in a slot 58 in the rod and backed up by a spring 59 which is installed for preventing breakage in case the machine runs with the burners extinguished and the glass is not softened.

In Figure 6 I show a number of forms of beads with the wires arranged in various groupings to meet the requirements in various forms of lamps or tubes. These will be quite apparent and it will be noted that in a number of cases the wires are arranged to extend from the bottom of the bead 29, as at 60. In a case like this the bead travels around twice with the bead turned over for the second trip and the wire already embedded is received by the hole 61, placed in the holder 29 for this purpose.

Various changes can be made in the disposition and form of the parts without departing from the scope of the invention.

The die block 27 can be made removable, being held in place by the screws 64, this allowing for the installation of die blocks that will have properly spaced openings 36 for a particular form of bead in lieu of leaving holes 36 vacant when a gap is to be left, which latter method is slow.

The base 24 of the holder can be provided with a sleeve 62 fitting inside of the boss 25 and held in place by a screw 63 which holds the support firmly in the head 13 and also can be used when necessary for making slight vertical adjustments of the support.

I claim:—

1. A bead machine comprising a rotatable support, means for rotating the support with an intermittent motion, a holder on which a glass base is supported, a die block above the holder for holding a wire so that it rests on the base, a cam for moving at least one of the holders to press the base and the wire together and a burner located so as to soften the base immediately before said pressing takes place.

2. A bead machine comprising a rotatable support, a holder on said support for supporting a base, a die block for holding a wire so that it rests on a base in the holder, and a cam on which the holder is moved and which forces the holder which in turn moves the base to press it over the ends of the wires.

3. A bead machine comprising a rotatable support, means for rotating the support, a slidable holder on said support on which a glass base can rest, a guide for wires supported on the base, a burner for directing flame on the base and a circular cam for moving the holder at the point where the burner is located whereby the wires are inserted into the base.

4. A bead machine comprising a rotatable support, a holder on the support, a circular cam under the holder for moving the holder, the holder having a recess in the top for supporting a base, a die block above the base support with openings in which wires are guided which wires rest on the base, and a burner for directing a flame on the base at a predetermined point in the rotation thereof.

5. A bead machine comprising a rotatable support, a circular cam under the support, a holder on the support having a recess in which a base can rest, a guide block above the recess and adapted to guide wires which rest on the base, and a foot on the holder which foot rests on the cam.

6. A bead machine comprising a support, a holder slidable vertically in the support, a die block above the support with a hole to guide a short wire above the holder, the holder having a recess on which a base can be placed, and means for raising the holder to force the base to embed the ends of the wires, said means also causing the retreat of the holder to allow lateral removal of the assembled base and wire from beneath the die block, and a cover for the die block.

7. A bead machine comprising a holder for a base, a die block with a hole for receiving a wire and holding it with its end on the base, and a cover swnging on the die block for preventing backward movement of the wire, the holder being mounted to retreat a distance sufficient to allow the lateral removal of the base and wires from beneath the die block.

8. A bead machine comprising a rotatable support, a holder movable vertically in the support, a die block having vertical holes passing through it, a cover on the die-block, and a cam on which the holder travels in its rotation and which cam acts to force the holder upward at a predetermined point in its rotation.

9. A bead machine comprising a rotatable support, a holder movable vertically in the support, a die block having vertical holes passing through it, a cover on the die block, and a cam on which the holder travels in its rotation and which cam acts to force the holder upward at a predetermined point in its rotation and a burner to direct flame to the holder before it is raised.

10. A bead machine comprising a rotatable support, a vertically movable holder on the support and having a recess in its top for supporting a base, a die block above the holder having holes extending vertically through it, a cover for the die block, a cam on which the bottom end of the holder travels, the cam having a raised portion for forcing the holder upward.

11. In a bead machine, a support, a holder slidable in the support and adapted to support a base on the top thereof, a die block above the holder and having vertically arranged holes passing through it, a cover for the die block and adapted to prevent the return of short wires placed in the die block and resting on the base, and a cam to force the holder upward to force the wires into the base and also having a lowered face to allow the assembled bead and wires to be withdrawn laterally below the die block.

12. In a bead machine, a vertically movable holder to support a base on the top thereof, a die block above the holder and having holes passing vertically through it, a removable cover on the die block to act as an abutment for wires in the holes that rest on the base, whereby the wires can be inserted from the top and withdrawn from the bottom of the die block and means for forcing the holder upward to join the bead and wires after their assembly.

13. In a bead machine, a support, a holder slidable in the support and having a shallow trough at the top, a die block on the support and having vertically disposed holes through it, a cover pivoted above the die block and arranged to swing to and from position to close the tops of the holes, and means for raising and lowering the holder.

14. In a bead machine, a support, a holder slidable in the support and having a shallow trough at the top, a die block on the support and having vertically disposed holes through it, a cover pivoted above the die block and arranged to swing to and from position to close the tops of the holes, and means for raising and lowering the holder, the holder including a stem to rest on said means and comprising a movable end, and a spring to retract under abnormal pressure against said end whereby excess pressure is not transmitted to the holder.

15. In a glass working machine adapted for embedding the end of a metal part in a glass part, in combination; means for holding a glass part; means for holding a metal part; means for moving said glass part and said metal part relative to each other and adapted to bring one against the other; means for yieldingly holding the glass part against the metal part under pressure; heating means for glass parts, means for moving said holding means to carry a glass part held thereby into operative relation with said heating means.

16. In a glass working machine adapted for embedding the end of a metal part in a glass part, in combination, means for holding a glass part; means for holding a metal part; cam means for moving said glass part and said metal part relative to each other adapted to bring one against the other and to hold the glass part against the metal part under pressure; heating means for glass parts; and means for moving said holding means to carry a lass part held thereby into operative relation with said heating means, while said cam means simultaneously moves said glass part into cooperating pressure relation with said metal part.

17. In a glass working machine adapted for embedding the end of a metal part in a glass part, in combination, means for holding a glass part, means for holding a metal part, means for moving said glass part against said metal part and adapted to hold the glass part against the metal part under resilient pressure; heating means for glass parts; and means for moving said holding means to carry a glass part held thereby into operative relation with said heating means, while said cam means simultaneously moves said glass part into cooperating pressure relation with said metal part.

18. In a glass working machine adapted for embedding the end of a metal part in a glass part, in combination, a work holder comprising means for holding a glass part and means for holding a metal part; means for moving said glass part holding means to bring a glass part against a metal part carried by said metal part holding means and for holding it thereagainst under pressure; heating means for glass parts; means for moving said work holder to carry a glass part held thereby into operative relation with said heating means; means for moving said work holder away from said heating means; and means operative upon movement of said work holder away from said heating means for moving said glass holding means away from said metal part holding means.

19. In a glass working machine adapted to embed the end of a metal part in a glass part, in combination, a glass heating means; a work holder movable into and out of operative relation to said glass heating means; said work holder comprising a holder adapted to carry a glass part, and a holder adapted to carry a metal part, said metal part holder being adapted to be in operative relation to said glass heating means when said work holder is thereat, and said glass part holder being mounted for movement toward and from said metal part holder to present the glass part in abutting relation against the metal part; and means operative upon movement of said work holder into operative relation to said glass heating means for moving said glass part holder to said metal part holder and for holding a glass part carried by said glass part holder in abutting relation under pressure against a metal part carried by said metal part holder.

20. In a glass working machine adapted to embed the end of a metal part in a glass part, in combination, a glass heating means, a work holder movable into and out of operative relation to said glass heating means, said work holder comprising a holder adapted to carry a glass part, and a holder adapted to carry a metal part, said metal part holder being adapted to be in operative relation to said glass heating means when said work holder is thereat, and said glass part holder being mounted for movement toward and from said metal part holder to present the glass part in abutting relation against the metal part; and means operative on said glass part holder upon movement of said work holder into operative relation to said glass heating means for moving said glass part holder to said metal part holder and for holding a glass part carried thereby into abutting relation under pressure, against a metal part carried by said metal part holder; and means operative upon movement of said work holder in a direction away from said glass heating means for moving said metal part holder away from said glass part holder.

21. In a glass working machine adapted to embed the end of a metal part in a glass part, in combination, a glass heating means, a work holder movable into and out of operative relation to said glass heating means; said work holder comprising a holder adapted to carry a glass part, and a holder adapted to carry a metal part, said metal part holder being adapted to be in operative relation to said glass heating means when said work holder is thereat, and said glass part holder being mounted for movement toward and from said metal part holder to present the glass part in abutting relation against the metal part; and means, operative on said glass part holder upon movement of said work holder into operative relation to said glass heating means, for moving said glass part holder to said metal part holder and including means for holding a glass part carried by said glass part holder in abutting relation, under pressure, against a metal part carried by said metal part holder; and means operative upon movement of said work holder in a direction away from said glass heating means for moving said glass part holder away from said metal part holder.

22. In a glass working machine adapted for embedding metal parts in glass parts, in combination, a rotatable carrier member; a plurality of work holders on said carrier member, each work holder being equally spaced from the center of rotation of said carrier member and being equally spaced each from the other circumferentially about said center of rotation; a circumferential cam member concentric with said rotatable carrier; each of said work holders comprising means for holding a glass part and means for holding a metal part, said glass part holding means being movable toward and from said metal part holding means; heating means adjacent said cam at a position adjacent to which said work holders can be moved into operative relation to said heating means by movement with said rotatable carrier; means connected with said glass part holding means and in operative relation to said cam, adapted upon movement of its workholder in a given direction on said rotatable carrier toward said heating means to move said glass holding means toward said metal part holding means.

23. In a glass working machine adapted for embedding metal parts in glass parts, in combination, a rotatable carrier member; a plurality of workholders on said carrier member, each workholder being equally spaced from the center of rotation of said carrier member and being equally spaced each from the other circumferentially about said center of rotation; a circumferential cam member concentric with said rotatable carrier; each of said workholders comprising means for holding a glass part and means for holding a metal part, said glass part holding means being movable toward and from said metal part holding means; heating means adjacent said cam at a position adjacent to which said workholders can be moved into operative relation to by movement with said rotatable carrier; means connected with said glass part holding means and in operative relation to said cam, adapted upon movement of its workholder in a given direction of said rotatable carrier toward said heating means to move said glass holding means to said metal part holding means; and means at said position adapted to engage said glass part holding means moving means and adapted to hold a glass part carried by said glass part holding means under pressure against a metal part carried by said metal part holding means.

24. In a glass working machine adapted for embedding metal parts in glass parts, in combination, a rotatable carrier member; a plurality of workholders on said carrier member; each workholder being equally spaced from the center of rotation of said carrier member and being equally spaced each from the other circumferentially about said center of rotation; a circumferential cam member concentric with said rotatable carrier; each of said workholders comprising means for holding a glass part and means for holding a metal part, said glass part holding means being movable toward and from said metal part holding means; heating means adjacent said cam at a position adjacent to which said workholders can be moved in operative relation to by movement with said rotatable carrier; means connected with said glass part holding means and in operative relation to said cam, adapted upon movement of its workholder in a given direction on said rotatable carrier toward said heating means to move said glass holding means to said metal part holding means; and spring means at said position adapted to engage said glass part holding means moving means are adapted to hold a glass part carried by said glass part holding means under pressure against a metal part carried by said metal part holder.

25. In a glass working machine adapted for embedding metal parts in glass parts, in combination, a rotatable carrier member; a plurality of workholders on said carrier member; each workholder being equally spaced from the center of rotation of said carrier member and being equally spaced each from the other circumferentially about said center of rotation; a circumferential cam member concentric with said rotatable carrier; each of said workholders comprising means for holding a glass part and means for holding a metal part; said glass part holding means being movable toward and from said metal part holding means; heating means adjacent said cam at a position adjacent to which said workholders can be moved in operative relation to said heating means by movement with said rotatable carrier; means connected with said glass part holding means, in operative relation to said cams, adapted upon movement of its workholder in a given direction of said rotatable carrier toward said heating means to move said glass holding means toward said metal part holding means and upon movement in the same direction away from said heating means to move said glass part holding means away from said metal part holding means.

26. In a glass working machine, adapted for embedding metal parts in glass parts, in combination, a rotatable carrier member; a plurality of workholders on said carrier member, each workholder being equally spaced from the center of rotation of said carrier member and being equally spaced each from the other circumferentially about said center of rotation, a circumferential cam member concentric with said rotatable carrier; each of said workholders comprising means for holding a glass part and means for holding a metal part, said glass part holding means being movable toward and from said metal part holding means; heating means adjacent said cam in a position into which said workholders can be moved in operative relation thereto by movement with said rotatable carrier; means connected with said glass part holding means in operative relation to said cam, adapted upon movement of its workholder in a given direction with said rotatable carrier toward said heating means to move said glass holding means toward said metal part holding means and upon movement in the same direction and away from said heating means to move said glass part holding means away from said metal part holding means; and spring means, at said position, adapted to engage said glass part moving means to hold a glass part carried by said glass part holder under pressure against a metal part carried by said metal part holder.

In testimony whereof I affix my signature.

CHARLES EISLER.